United States Patent [19]

Mohr

[11] 4,006,921
[45] Feb. 8, 1977

[54] PIPE COUPLING

[75] Inventor: Harvey O. Mohr, Houston, Tex.

[73] Assignee: HydroTech International, Inc., Houston, Tex.

[22] Filed: June 10, 1975

[21] Appl. No.: 585,504

[52] U.S. Cl. .................................. 285/18; 285/3; 285/93; 285/323; 285/343; 285/348
[51] Int. Cl.² ...................................... F16L 35/00
[58] Field of Search ................. 285/18, 3, 96, 106, 285/261, DIG. 21, 93, 308, 321, 144–148, 339, 348, 343, 322, 323, 342, 341

[56] References Cited

UNITED STATES PATENTS

| 3,134,610 | 5/1964 | Musulf | 285/147 X |
| 3,684,322 | 8/1972 | Kotsakis | 285/343 |
| 3,713,675 | 1/1973 | White | 285/322 |
| 3,895,831 | 7/1975 | Fisher | 285/DIG. 18 |

FOREIGN PATENTS OR APPLICATIONS 776,036   5/1957   United Kingdom ............... 285/343

Primary Examiner—Dave W. Arola

[57] ABSTRACT

Apparatus for locking together two mutually telescoping tubular members against relative axial movement, the combination comprising; annular bowl means housed within one of the tubular members and including a pair of axially and oppositely tapered annular surfaces; a plurality of gripping elements circumferentially disposed within the annular bowl means, each gripping element including a pair of oppositely tapered surfaces mateably engaged with respective tapered surfaces of the bowl means; the bowl means and gripping elements being movable between a retracted position in which the tubular members are freely assemblable in the mutually telescoping relationship aforesaid and an extended and locked position in which the bowl means applies opposing forces against both tapered surfaces of each gripping element to squeeze the latter into tight gripping engagement with the other tubular member whereby both tubular members are locked against relative axial movement, and means for moving the bowl means and gripping elements between the retracted and extended positions.

12 Claims, 4 Drawing Figures

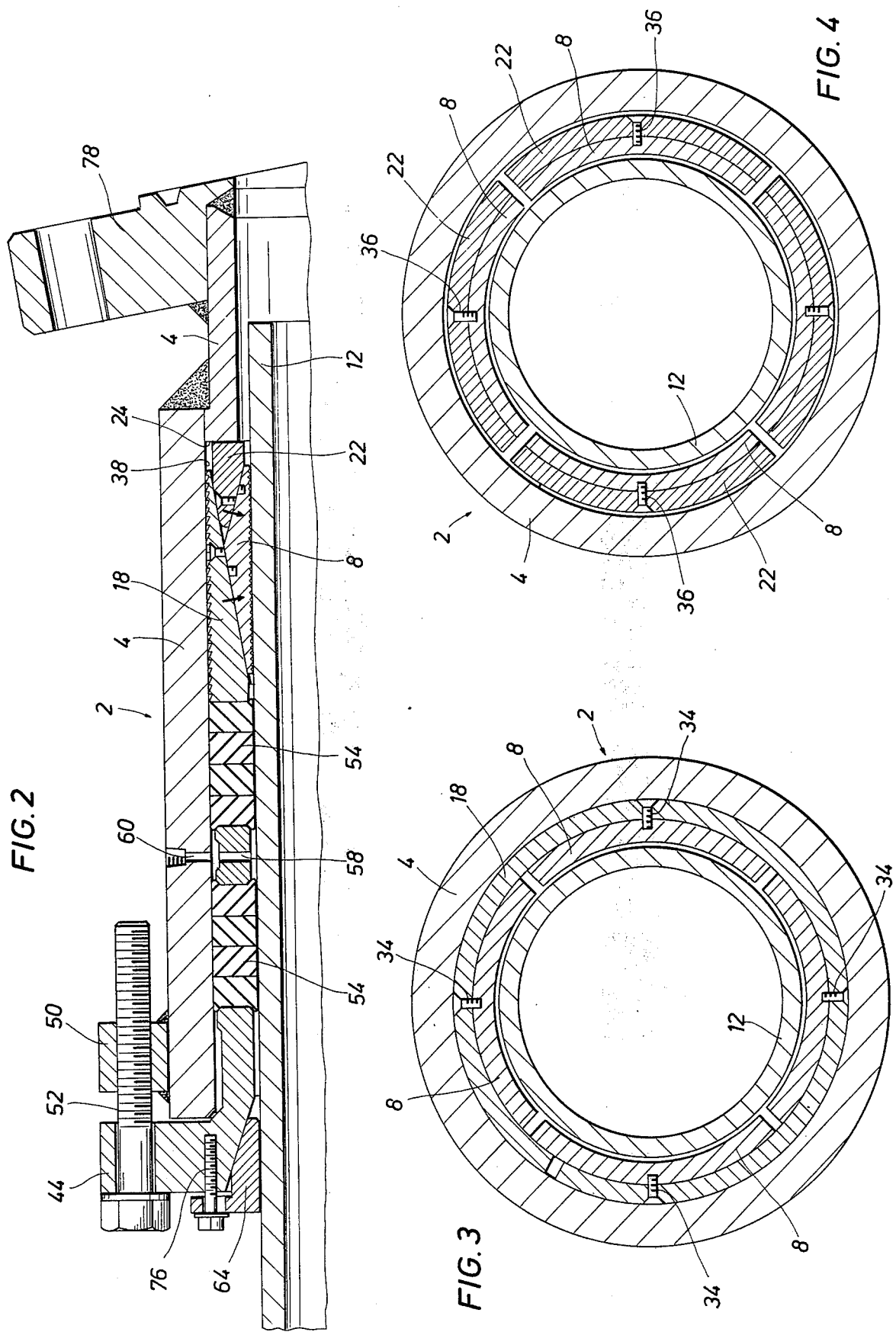

PIPE COUPLING

BACKGROUND OF THE INVENTION a. Field of the Invention

The present invention relates broadly to a coupling of the type which is telescopically engaged with the end of a pipe. In particular, the invention has regard to an improved coupling of this type having locking apparatus which rigidly locks the coupling and pipe together against relative axial movement.

b. Description of the Prior Art

U.S. Pat. No. 3,704,033 discloses a coupling having locking apparatus in the form of a single set of gripping elements or slips where the slips are disposed in side-by-side circumferential relationship to encircle the pipe. Each slip in turn includes a pair of oppositely tapered surfaces mateably engaged with a pair of axially and oppositely tapered surfaces of an annular bowl assembly; one tapered bowl surface being movable axially towards the other tapered bowl surface, which is stationary in this case, to cam the slips radially inward towards gripping engagement with the pipe whereby the coupling and pipe are locked together against relative axial movement. More particularly, the double tapered configuration between the slips and bowl assembly serves to procure resistance to axial tension and compression forces between the coupling and pipe to lock them together. Under certain circumstances however, it has been found that this particular form of locking apparatus does not resist large axial forces imparted to the coupling and pipe. It is believed that this a result of the bowl assembly not moving the slips into uniform and firm gripping engagement with the pipe. That is to say, it is believed that because only one tapered bowl surface is movable to set the slips, the slips do not achieve their optimum set position and, hence, are unable to resist large tension and compression forces which may be imparted to the coupling and pipe.

SUMMARY OF THE INVENTION

It is, therefore, a broad object of the present invention to provide an improved coupling having locking apparatus which rigidly locks the coupling and a pipe together against relative axial movement.

A related object of the present invention is to provide an improved coupling having locking apparatus which includes a plurality of slips having oppositely tapered surfaces mateably engaged with a pair of axially and oppositely tapered surfaces of an annular bowl means; both tapered bowl surfaces being movable to set the slips.

To achieve the foregoing and other obvious objects of the invention, both stated and unstated hereinafter, the invention provides apparatus for locking together two mutually telescoping tubular members against relative axial movement, the combination comprising; annular bowl means housed within one of the tubular members and including a pair of axially and oppositely tapered annular surfaces; a plurality of gripping elements circumferentially disposed within the annular bowl means, each gripping element including a pair of oppositely tapered surfaces mateably engaged with respective tapered surfaces of the bowl means; the bowl means and gripping elements being movable between a retracted position in which the tubular members are freely assemblable in the mutually telescoping relationship aforesaid and an extended and locked position in which the bowl means applies opposing forces against both tapered surfaces of each gripping element to squeeze the latter into tight gripping engagement with the other tubular member whereby both tubular members are locked against relative axial movement, and means for moving the bowl means and gripping elements between the retracted and extended positions.

Other objects of the invention more or less broad than the foregoing will become apparent from the hereinafter following description of the elements, parts and principles of the invention given herein solely by way of example and with reference to the accompanying drawing wherein like reference numerals refer to like parts of the invention.

BRIEF DESCRIPTION OF THE DRAWINGS

FIG. 2 is a partial view of FIG. 1 showing the locking apparatus in the set position;

FIG. 3 is a cross-sectional view of the coupling taken along lines 3—3 of FIG. 1, and FIG. 4 is a cross-sectional view of the coupling taken along lines 4—4 of FIG. 1.

DESCRIPTION OF THE PREFERRED EMBODIMENT

Figure 1:
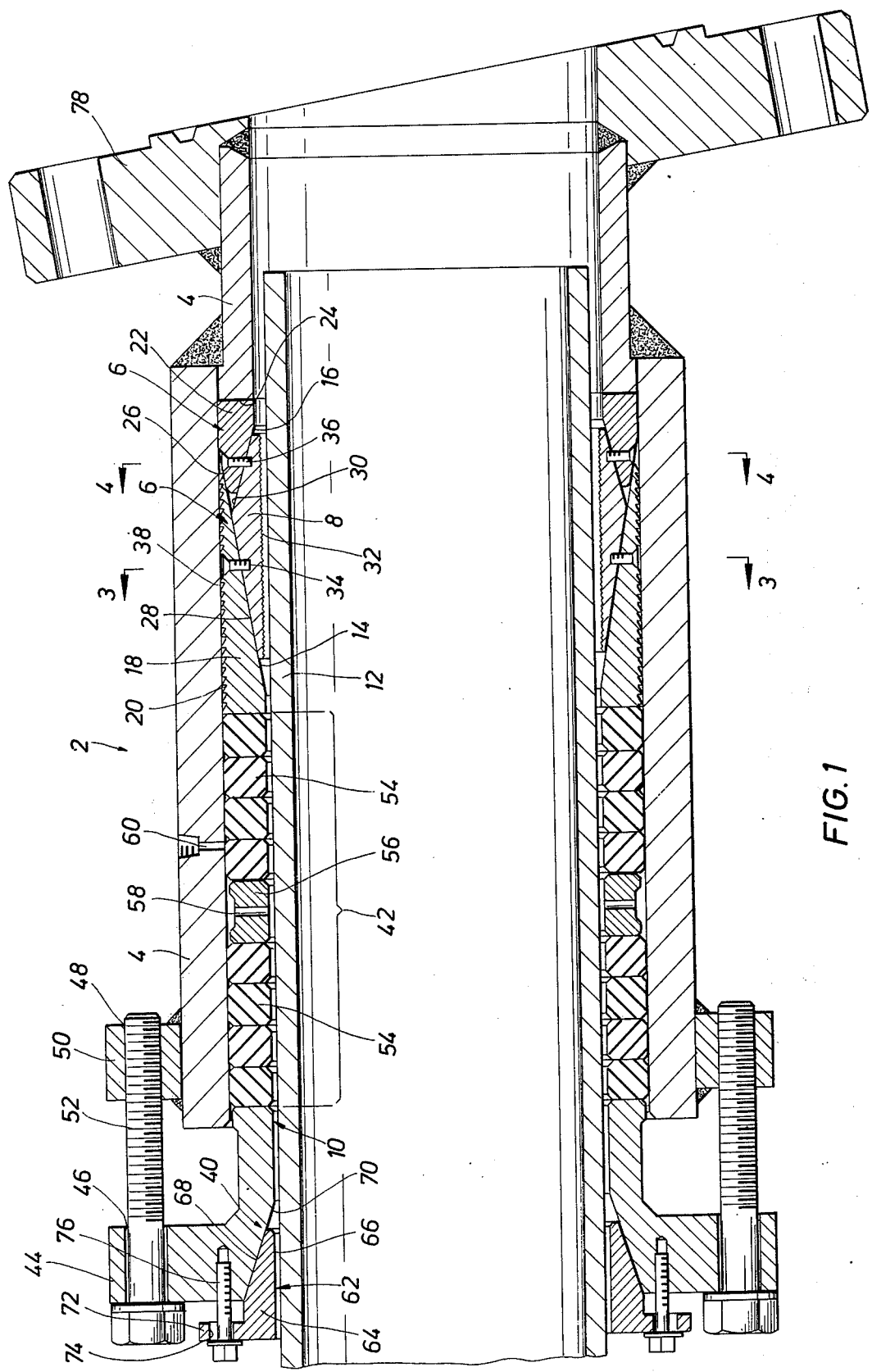
FIG. 1 is a longitudinal cross-sectional view of the coupling according to the present invention; the locking apparatus being shown in the unset position.

The presently preferred embodiment of the invention as visualized herein is illustrated generally in FIG. 1. As shown therein, coupling 2 includes a tubular member 4 within which is housed an annular bowl means 6, a plurality of gripping elements or slips 8 circumferentially disposed within bowl means 6, and moving means 10, the latter serving to move the bowl means 6 and slips 8 from the retracted or unset position of FIG. 1 to the extended or set position of FIG. 2 in which slips 8 engage a pipe 12 telescoped within coupling 2.

More particularly, bowl means 6 includes a pair of axially and oppositely tapered annular surfaces 14 and 16. In this preferred embodiment of the invention, tapered bowl surface 14 constitutes an inner surface of an annular thrust member 18 movable axially between a retracted position of FIG. 1 and an extended position of FIG; 2 said thrust member 18 preferably being in the form of a split ring as best shown in FIG. 3. For reasons which will appear, thrust member 18 includes an axially serrated outer surface 20. Tapered bowl surface 16, on the other hand, is constituted by the inner surfaces collectively of a plurality of cam members 22 movable radially between a retracted position of FIG. 1 and an extended position of FIG. 2. Each cam member 22 in turn is movably engaged with an annular shoulder 24 of said tubular member 4 and includes an outer tapered surface 26 mateably and slidably engaged with said tapered bowl surface 14 as best shown in FIG. 1.

Eash slip 8 includes a pair of oppositely tapered surfaces 28 and 30 mateably engaged with said tapered bowl surfaces 14 and 16, respectively as illustrated in FIGS. 1 and 2; it being recognized that slip surface 28 engages said tapered bowl surface 14 in axially spaced relation to the engagement of said tapered bowl surface 14 with cam surface 26.

in addition, each slip 8 includes an axially serrated gripping surface 32 for biting into the external surface of pipe 12 in the conventional manner. Preferably, said slips 8 and cam members 22 are equal in number (four in this embodiment), and are circumferentially aligned relative to each other as exemplified in FIG. 4. In order to temporarily maintain slips 8, thrust member 18 and cam members 22 in the assembled and retracted position of FIG. 1, shear pins 34 are provided to attach thrust member 18 to slips 8 with shear pins 36 being provided to attach slips 8 to cam member 22. Accordingly, it will be understood that when thrust member 18 moves axially in one direction shear pins 34 and 36 will shear whereupon slips 8 and cam members 22 will be biased inwardly by tapered bowl surface 14 to the extended or set position of FIG. 2 to thereby position slips 8 in firm gripping engagement with pipe 12. In that event, it will be further understood that said tapered bowl surfaces 14 and 16 apply opposing forces (as exemplified by the converging arrows in FIG. 2) against both tapered surfaces 28 and 30 of each slip 8 to squeeze the latter into tight gripping engagement with the pipe 12 whereby the coupling 2 and pipe 12 are locked together against relative axial movement; the locking engagement being augmented in this case by thrust member 18 being wedged against an internal wall 38 of tubular member 4 whereby said serrated outer surface 20 bites into internal wall 38.

It is noteworthy, that both tapered surfaces of bowl means 6 according to the present invention are movable between said retracted and extended positions in contrast to the prior art previously discussed, and it is believed that this movement enables the slips 8 to achieve their optimum set position to perform their intended function.

With more particular regard now to said moving means 10, it includes in this preferred embodiment of the invention an annular piston 40 operably connected to said tubular member 4 and an annular deformable seal means 42 interposed between said piston 40 and said thrust member 18 as best shown in FIG. 1, whereby when said piston 40 and seal means 42 move axially in one direction said thrust member 18 will be moved towards its extended position with consequent deformation of said seal means 42 to effect a seal (FIG. 2) between said pipe 12 and tubular member 4. More particularly, said piston 40 includes at one end thereof an outwardly extending annular flange 44 (FIG. 1) having a plurality of circumferentially spaced holes 46 therein (one being shown); said holes 46 being axially aligned with a plurality of circumferentially spaced holes 48 (one being shown) in an outwardly extending annular flange 50 fixed to said tubular member 4. Extending through hole 46 and threaded into hole 48 are a plurality of bolts 52 (one being shown) for drawing said piston 40 axially in one direction enabling the other end thereof to abut against said seal means 42. Seal means 42 in turn includes a plurality of elastomeric annular rings 54 positioned on axially opposite sides of an annular pressure testing ring 56 having a radially oriented port 58 therein capable of communicating with a port 60 in said tubular member 4 when said seal means 42 in their extended position of FIG. 2. In the extended position, elastomeric rings 54 are deformed into sealing engagement with pipe 12 and tubular memeber 4 and the effectiveness of the seal can be tested by introducing pressurized fluid into port 60 and port 58 in the known manner.

In addition, coupling 2 as visualized herein includes support means 62 operably connected to annular piston 40 for supporting pipe 12 therein against relative or transverse movement which may occur, particularly if pipe 12 and coupling 2 are located in a sub-sea environment where wave action is prevalent. More particularly, support means 62 includes a plurality of segments 64 (one being shown) circumferentially spaced apart about piston 40; each segment 64 having an arcuate inner surface 66 to conform to the contour of pipe 12 and a conically shaped outer surface 68 to conform to an annular and conically shaped inner surface 70 of piston 40. Further, each segment 64 includes an outwardly extending flange 72 having a hole 74 therein. Extending through hole 74 and threaded into piston 40 is a bolt 76 for drawing segment 64 from the position of FIG. 1 to the position of FIG. 2; hole 74 being sufficiently enlarged to enable segment 64 to move axially and radially inward to the pipe engaging position. In the latter position, each segment 64 is wedged between piston 40 and pipe 12 to thereby support pipe 12 within piston 40 against relative bending or transverse movement.

By way of brief summary, therefore, coupling 2 according to the present invention includes locking apparatus which rigidly locks coupling 2 and pipe 12 together against relative axial movement; coupling 2 having a flange 78 in this embodiment for engaging a mating flange (not shown) in the conventional manner. The locking apparatus in turn includes a plurality of slips 8 having oppositely tapered surfaces 28 and 30 mateably engaged with a pair of axially and oppositely tapered surfaces 14 and 16, respectively of an annular bowl means 6 with both tapered bowl surfaces being movable with the slips to place them in their optimum set position.

What is claimed is:
1. In apparatus for locking together two mutually telescoping rigid tubular members against relative axial movement, the combination comprising:
  annular bowl means locked within one of said rigid tubular members and including a pair of axially and oppositely tapered annular surfaces;
  annular gripping means comprising a plurality of gripping elements disposed within said annular bowl means, said annular gripping means including a pair of oppositely tapered surfaces mateably engaged with respective tapered surfaces of said bowl means;
  said bowl means including said pair of annular bowl surfaces and said gripping means being movable between a retracted position in which said rigid tubular members are freely assemblable in the mutually telescoping relationship aforesaid and an extended and locked position in which said bowl means including said pair of annular bowl surfaces applies opposing forces against both tapered surfaces of said gripping means to squeeze the latter into tight gripping and locking engagement with the other rigid tubular member whereby both tubular members are locked against relative axial movement while said bowl means is at least partially engaged with said one rigid tubular member;
  and means for moving said bowl means and said gripping means towards said extended positions.
2. Apparatus as defined in claim 1 wherein:
  one of said tapered bowl surfaces is radially movable between said retracted and extended positions.
3. Apparatus as defined in Claim 2 wherein:
  the other tapered bowl surface is axially movable between said retracted and extended positions.

4. In apparatus for locking together two mutually telescoping tubular members against relative axial movement, the combination comprising:

annular bowl means engagably supported within one of said tubular members and including a pair of axially and oppositely tapered annular surfaces with one of said tapered bowl surfaces being radially movable and the other tapered bowl surface being axially movable;

a plurality of gripping elements circumferentially disposed within said annular bowl means, each said gripping element including a pair of oppositely tapered surfaces mateably engaged with respective tapered surfaces of said bowl means;

said bowl means and gripping elements being movable between a retracted position in which said tubular members are freely assemblable in the mutually telescoping relationship aforesaid and an extended and locked position in which said bowl means applies opposing forces against both tapered surfaces of each gripping element to squeeze the latter into tight gripping engagement with the other tubular member whereby both tubular members are locked against relative axial movement;

means for moving said bowl means and gripping elements between said retracted and extended positions;

and with said one tapered bowl surface constituting the inner surfaces collectively of a plurality of radially movable cam members, each said cam member including an outer tapered surface mateably engaged with said other tapered bowl surface in spaced relation to said gripping elements enabling said cam members to be moved radially inwardly by said other tapered bowl surface when the latter moves axially towards the extended position.

5. Apparatus as defined in claim 4 wherein:
said cam members are movably engaged with an annular shoulder of said one tubular member.

6. Apparatus as defined in claim 4 wherein:
said other tapered bowl surface constitutes the inner surface of an annular thrust member axially movable between said retracted and extended positions.

7. Apparatus as defined in claim 6 wherein:
said annular thrust member constitutes a split ring.

8. Apparatus as defined in claim 7 wherein:
said annular thrust member includes a serrated outer surface capable of biting into an internal wall of said one tubular member to lock said thrust member in said extended position.

9. Apparatus as defined in claim 6 wherein:
said moving means includes an annular piston operably connected to said one member and an annular deformable seal means interposed between said piston and said thrust member, whereby when said piston and seal means move axially in one direction said thrust member will be moved towards said extended position with consequent deformation of said seal means to effect a seal between said tubular members.

10. Apparatus as defined in claim 9 and further including:
means operably connected to said annular piston for supporting the other tubular member therein against relative transverse movement.

11. Apparatus as defined in claim 4 wherein:
said cam members and gripping elements are equal in number and circumferentially aligned.

12. In apparatus for locking together two mutually telescoping tubular members against relative axial movement, the combination comprising:

annular bowl means supported within one of said tubular members and engageable therewith, and including a pair of axially and oppositely tapered annular surfaces with one of said tapered bowl surfaces being radially movable and the other tapered bowl surface being axially movable;

a plurality of gripping elements circumferentially disposed within said annular bowl means, each said gripping element including a pair of oppositely tapered surfaces mateably engaged with respective tapered surfaces of said bowl means;

said bowl means and gripping elements being movable between a retracted position in which said tubular members are freely assemblable in the mutually telescoping relationship aforesaid and an extended and locked position in which said bowl means applies opposing forces against both tapered surfaces of each gripping element to squeeze the latter into tight gripping engagement with the other tubular member whereby both tubular members are locked against relative axial movement, and means for moving said bowl means and gripping elements between said retracted and extended positions.

* * * * *